US012608355B2

(12) United States Patent
Mishra et al.

(10) Patent No.: US 12,608,355 B2
(45) Date of Patent: Apr. 21, 2026

(54) FLEXIBLE SPECIFICATION AND STORAGE OF VECTOR TYPE

(71) Applicant: Oracle International Corporation, Redwood Shores, CA (US)

(72) Inventors: Aurosish Mishra, Foster City, CA (US); Shasank Kisan Chavan, Menlo Park, CA (US); Shubha Bose, Foster City, CA (US); Meenakshi Sundaram Arumugam, Belmont, CA (US); Zhen Hua Liu, San Mateo, CA (US); Tirthankar Lahiri, Palo Alto, CA (US); Juan R. Loaiza, Woodside, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/885,645

(22) Filed: Sep. 14, 2024

(65) Prior Publication Data

US 2025/0284679 A1 Sep. 11, 2025

Related U.S. Application Data

(60) Provisional application No. 63/563,926, filed on Mar. 11, 2024.

(51) Int. Cl.
G06F 16/22 (2019.01)
G06F 16/245 (2019.01)
G06F 16/2455 (2019.01)
G06F 16/334 (2025.01)

(52) U.S. Cl.
CPC ........ *G06F 16/2237* (2019.01); *G06F 16/221* (2019.01); *G06F 16/2264* (2019.01); *G06F 16/245* (2019.01); *G06F 16/24553* (2019.01); *G06F 16/2456* (2019.01); *G06F 16/3347* (2019.01)

(58) Field of Classification Search
CPC .............. G06F 16/221; G06F 16/2237; G06F 16/24553; G06F 16/2264; G06F 16/245; G06F 16/2456; G06F 16/3347; G06F 16/24532
See application file for complete search history.

(56) References Cited

U.S. PATENT DOCUMENTS

| | | | |
|---|---|---|---|
| 10,268,710 | B2 | 4/2019 | Hu |
| 10,496,614 | B2 | 12/2019 | Hu |
| 11,204,900 | B2 | 12/2021 | Hu |

(Continued)

FOREIGN PATENT DOCUMENTS

WO WO2017062288 A1 4/2017

*Primary Examiner* — Dangelino N Gortayo
(74) *Attorney, Agent, or Firm* — Hickman Becker Bingham Ledesma LLP

(57) ABSTRACT
Techniques for flexible specification and storage of objects of the VECTOR type are provided. In one technique, a table specification that specifies a column having a VECTOR data type is received. A first vector that has a first number of dimensions and a first dimension format is stored in the column. A second vector that has a second number of dimensions and a second dimension format is stored in the column. The first number of dimensions is different than the second number of dimensions or the first dimension format is different than the second dimension format.

20 Claims, 7 Drawing Sheets

(56)　　　　　References Cited

U.S. PATENT DOCUMENTS

| | | | | |
|---|---|---|---|---|
| 12,210,537 | B2 * | 1/2025 | Ilan | G06F 16/2465 |
| 2012/0310916 | A1 | 12/2012 | Abadi | |
| 2017/0103092 | A1 | 4/2017 | Hu | |
| 2017/0103094 | A1 | 4/2017 | Hu | |
| 2017/0103116 | A1 | 4/2017 | Hu | |
| 2017/0293662 | A1 * | 10/2017 | Tyercha | G06F 16/2237 |
| 2018/0329935 | A1 | 11/2018 | Mugali | |
| 2019/0220450 | A1 | 7/2019 | Hu | |
| 2019/0227739 | A1 * | 7/2019 | Khan | G06F 12/0207 |
| 2019/0258613 | A1 | 8/2019 | Hu | |
| 2020/0242157 | A1 | 7/2020 | Liu | |
| 2022/0035848 | A1 * | 2/2022 | Kataoka | G06F 16/334 |
| 2022/0067008 | A1 * | 3/2022 | Li | G06N 3/088 |
| 2023/0051059 | A1 * | 2/2023 | Portisch | G06F 16/285 |
| 2023/0273940 | A1 | 8/2023 | Shu | |
| 2023/0297891 | A1 * | 9/2023 | Kataoka | G06N 3/084 |
| 2023/0306028 | A1 | 9/2023 | Kogan | |

* cited by examiner

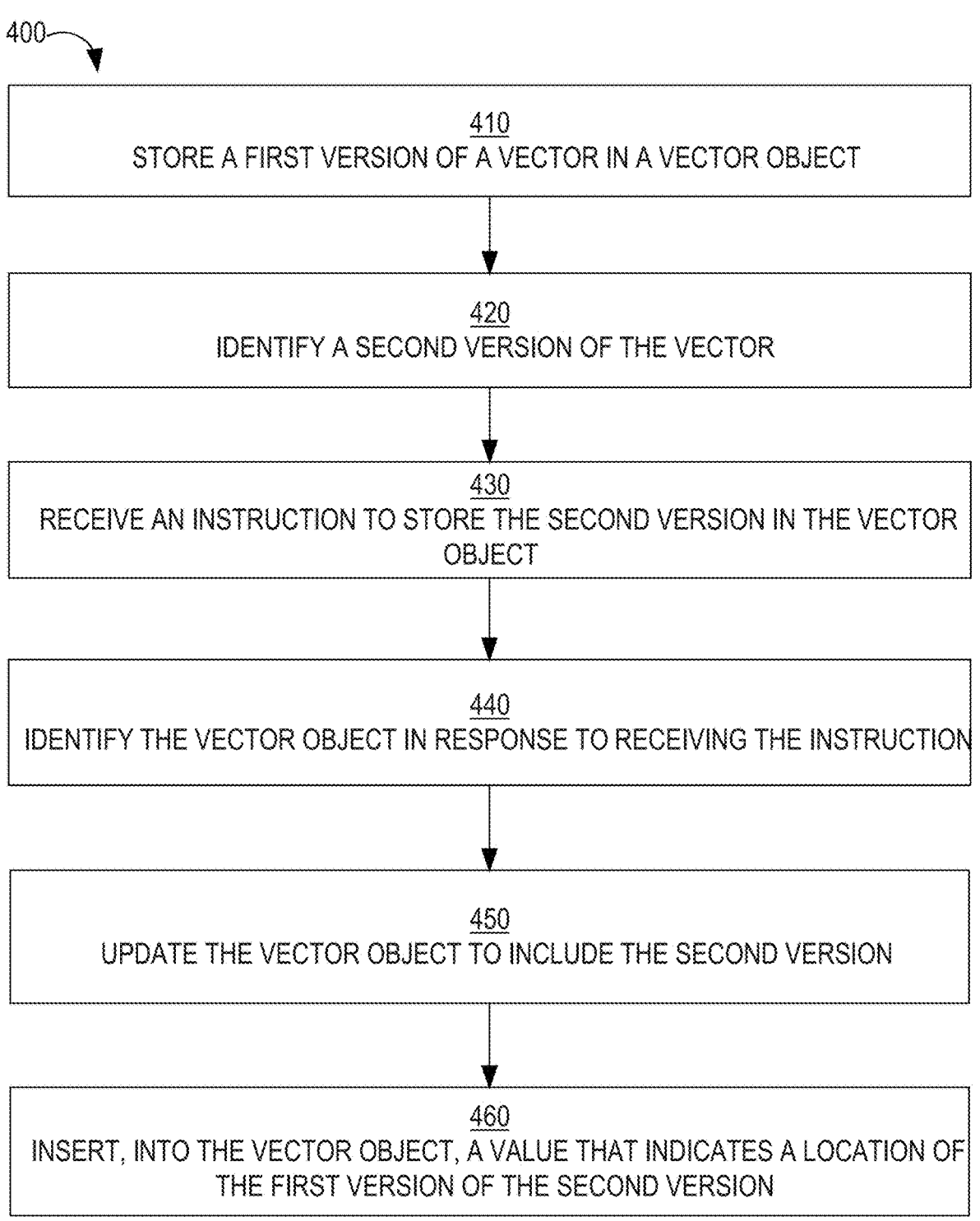

400

410
STORE A FIRST VERSION OF A VECTOR IN A VECTOR OBJECT

420
IDENTIFY A SECOND VERSION OF THE VECTOR

430
RECEIVE AN INSTRUCTION TO STORE THE SECOND VERSION IN THE VECTOR OBJECT

440
IDENTIFY THE VECTOR OBJECT IN RESPONSE TO RECEIVING THE INSTRUCTION

450
UPDATE THE VECTOR OBJECT TO INCLUDE THE SECOND VERSION

460
INSERT, INTO THE VECTOR OBJECT, A VALUE THAT INDICATES A LOCATION OF THE FIRST VERSION OF THE SECOND VERSION

*FIG. 4*

FLEXIBLE SPECIFICATION AND STORAGE OF VECTOR TYPE

BENEFIT CLAIM

This application claims the benefit under 35 U.S.C. § 119(e) of U.S. Provisional Application No. 63/563,926, filed Mar. 11, 2024, by Lahiri et al., the entire contents of which is hereby incorporated by reference.

RELATED APPLICATIONS

This application is related to U.S. patent application Ser. No. 18/885,630; U.S. patent application Ser. No. 18/885,635; U.S. patent application Ser. No. 18/885,636; U.S. patent application Ser. No. 18/885,639 and U.S. patent application Ser. No. 18/885,640, each of which were filed on Sep. 14, 2024, the contents of which are hereby incorporated by reference; and U.S. patent application Ser. No. 18/828,330, filed Sep. 9, 2024, the contents of which are hereby incorporated by reference.

TECHNICAL FIELD

The present disclosure relates generally to vector database systems and, more particularly, to providing flexible specification and storage for vectors of various characteristics.

BACKGROUND

A vector is a fixed length sequence of numbers, typically floating point numbers, such as [21.4, 45.2, 675.34, 19.4, 83.24], which is a five-dimensional vector. An embedding is a means of representing objects (e.g., text, images, and audio) as points in a continuous vector space where the locations of those points in space are semantically meaningful to one or more machine learning (ML) algorithms. An embedding is often represented as a vector. Generically, a vector embedding represents a point in N-dimensional space. Vector embeddings are intended to capture the important "features" of the data that the vector embeddings represent (or embed). The data a vector embedding represents can be one of many types of data, such as a document, an email, an image, or a video. Examples of features are color, size, category, location, texture, meaning, and concept. Each feature is represented by one or more numbers (dimensions) in the vector embedding. Hereinafter, a "vector embedding" is referred to as a "vector."

Today, vectors are often generated by machine-learned models (e.g., neural networks) and the features they represent are often difficult for humans to understand. One way that vectors are produced by neural networks is by capturing the outputs of the neurons in the penultimate layer, i.e., the neural network's outputs just before the final processing layer.

Distance Between Vectors

An important attribute of vectors is that the distance between two vectors is a good proxy for the similarity of the objects represented by the vectors. Two vectors that represent similar data should be a short distance from each other in vector space. The opposite is also true: dissimilar data are represented by vectors that are far apart from each other in the vector space. For example, the distance between a vector for the word "cat" and a vector for the word "dog" should be less than the distance the vector for the word "cat" and a vector for the word "plant."

The distance between two vectors is often calculated by summing the squares of the difference between the numbers in each position of the vectors:

$$(Vector1[1] - Vector2[1])^\wedge 2 + (Vector1[2] - Vector2[2])^\wedge 2 + \ldots$$

The property that vector distance represents object similarity is what allows similar data to be found using a vector database. For example, when a vector representing a picture of a dog is searched for in a vector database, the nearest vectors will be those representing other dogs, not vectors representing plants.

Vector Processing Workloads

Vector processing workloads (not to be confused with SIMD vector processing) have been used in Natural Language Processing (NLP), image recognition, recommendations, etc. Vector processing workloads have two sub-categories that require separate optimization strategies: indexing and searching. Regarding indexing, vector embeddings (or simply vectors) are indexed using approximate indexing techniques. Unlike B-tree indexes, a vector index returns many matching values ranked by similarity. Index creation and rebuild tend to be CPU intensive and are optimized for throughput.

Regarding searching, the stored vectors are searched using a class of algorithms known as "Similarity Search" or "Approximate Nearest Neighbor (ANN)" to find the closest vectors to a query vector. Search is designed to minimize CPU usage in order to minimize response time.

Vector Processing Patterns

A vector similarity search is like interactive online transaction processing (OLTP) in that end-users submit vector queries and expect an instant reply. Vector similarity search requires millisecond response time to finding vectors that are close (represent similar data) even when the database in which the vectors are stored holds billions of vectors. An example query is "find products that are similar to this picture" [reference to a digital image]." Another example query is "find corporate documents that conceptually match this natural language prompt: [NL prompt]."

Providing fast response times requires using specialized vector indexes and fast algorithms for computing distances between vectors. In some use cases, there is a need to combine vector similarity search with relational data. For example, a query may ask for data about houses that match a natural language prompt, are valued at over $1M, are in zip code 94070, and whose owner recently declared bankruptcy. Also, there may be a need to be able to insert new vectors into a database, delete vectors from the database, and index the vectors in real time.

Vector Databases

Early vector workloads often used flat files or object stores to store vectors. An application would read the vectors out of their backend repositories into memory and perform vector processing using third-party libraries, such as FAISS. Generative artificial intelligence (AI) has greatly increased the volume and processing needs for vectors. Generative AI requires support for much higher volume ingest and faster filtering and retrieval. A database with vector capabilities and built-in indexing is important for these applications.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 4 is a flow diagram that depicts an example process for storing multiple versions of a vector into a single vector object, in an embodiment;

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system and method for the flexible specification and storage of the VECTOR type are provided. In one technique, a column of the VECTOR type is defined without specifying a dimension count and/or dimension format. Thereafter, a first vector with a first dimension count and a second vector with a second dimension count may be stored in the column. Additionally or alternatively, a first vector with a first dimension format and a second vector with a second dimension format may be stored in the column. The vectors may have been generated based on different embedding models or different versions of the same embedding model.

Embodiments improve computer-related technology pertaining to vector specification and storage. A flexible specification allows users to seamlessly evolve the contents of a VECTOR column over time. There are a wide range of embedding models with different dimension counts and dimension formats that can be chosen to vectorize user data, for example. One well-known embedding model produces vectors of 1536 dimensions of FLOAT32, while another embedding model produces vectors of 1024 dimensions of FLOAT32, while another embedding model produces vectors of 384 dimensions of INT8.

Allowing the storage of vectors of various dimensions and/or formats in a single column of a table allows embedding models that produce those vectors to change over time while not requiring applications that read and write to that column to change over time. Users desire to test embeddings from various embedding models in order to judge the quality of semantic search results before choosing an embedding model for production. Thus, embedding models are constantly being modified in order to produce embeddings that accurately represent sets of data. However, constantly changing a search application, for example, that operates on those embeddings would be laborious and error prone. Having a flexible specification allows a user to keep the schema consistent while changing the content stored in the VECTOR column. This is extremely useful to keep applications unchanged even though the underlying content may change. Another advantage of a flexible specification is that API calls are easier, since only the VECTOR name needs to be passed without having to specify a number of dimensions and/or a dimension format.

Vector Database System Overview

Figure 1:
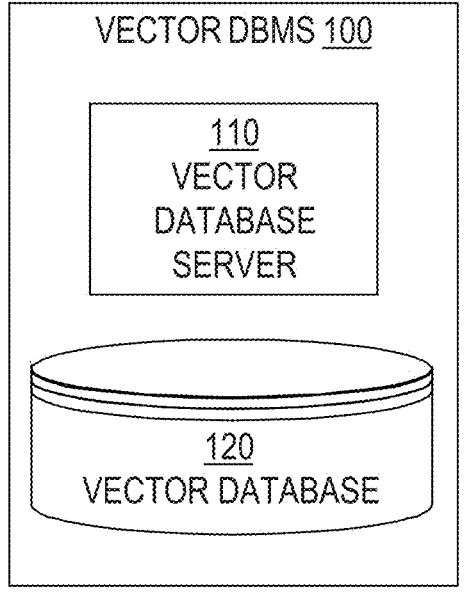
FIG. 1 is a block diagram that depicts an example vector database management system (VDBMS), in an embodiment.

FIG. 1 is a block diagram that depicts an example vector database management system (VDBMS) 100, in an embodiment. VDBMS 100 comprises a vector database server 110 and a vector database 120. Vector database server 110 is communicatively coupled to vector database 120. VDBMS 100 may be deployed in a network of an enterprise or may be deployed in a cloud environment and, therefore, may be accessible to an enterprise over one or more computer networks (e.g., the Internet). VDBMS 100 may be provisioned for an enterprise by a cloud management team of a cloud provider as needed on an enterprise-by-enterprise basis.

Vector database server 110 comprises one or more computing machines, each executing one or more compute instances that receive and process data requests, including data retrieval requests (e.g., queries) and data modification requests (i.e., for vector data modifications), such as inserting vectors, deleting vectors, and updating vectors. A computing instance translates a data request into a storage layer request that the computing instance transmits to vector database 120. A computing machine that hosts at least one compute instance includes (1) one or more processors, (2) volatile memory for storing data requests (and their respective contents) and vector data that is retrieved from vector database 120, and (3) optionally, non-volatile memory.

Vector database 120 may comprise multiple storage devices, each storing vector data and, optionally, one or more non-vector data. For example, vector database 120 stores a table that includes a column for storing vectors and one or more column for storing user data, such as a column for storing a user identifier, a column for storing a user profile, a column for storing user search history, a column for storing user access history, a column for storing user-generated content, etc. In this example, each row in the table corresponds to a user, such as a customer, a subscriber to a service, etc.

Vector database 120 may also store one or more indexes that index content in vector database 120, such as content stored in one or more base tables. Some of the indexed content may be vector-related data (e.g., actual vector embeddings and metadata thereof) and some of the indexed content may be non-vector-related data, such as content in columns that do not store vectors. Thus, at least one index that vector database 120 may store is a vector index, described in more detail herein.

Native Support for Vector Embeddings

In an embodiment, VDBMS 100 provides native support for a new vector embedding ("VECTOR") datatype. The native support may include operators and indexes that are associated with that datatype. Examples of other datatypes that may be natively supported by VDBMS 100 include INT (integer), FLOAT (floating point), DATE, and STRING.

A VECTOR column may be defined with two values: a number of elements/dimensions and a dimension format (or "element type"). A generic example of VECTOR datatype syntax is the following:

VECTOR(<Num Elements>, <Element Type>).

The following is an example is using this VECTOR datatype syntax to create a new table for storing vectors:

```
create table vector_tab (id NUMBER, attributes JSON, data VECTOR
(768,
    'FLOAT32'))
``` where "id", "attributes", and "data" are names of columns of the table named "vector_tab." The first column in vector_tab is a NUMBER datatype, the second column in vector_tab is a JSON datatype, and the third column in vector_tab is a VECTOR datatype.

Different types of functions may be supported as part of this new VECTOR datatype. Example functions include distance functions, aggregate functions, and single vector functions. An example distance function is "VECTOR_DISTANCE(vector1, vector2, <optional distance metric>)." This distance function computes a distance between vector1 and vector2 and is the most common operation forming the basis of similarity search. Distance metrics may be in Euclidean (which may be the default metric), cosine distance (1−cosine similarity), dot distance (negative of dot product), Manhattan, Hamming, etc. This distance function may return different types of values depending on the storage representation. For example, this distance function returns (a) a binary float value if the storage representation is four bytes or less or (b) a binary double value otherwise.

An example of an aggregate function is "VECTOR_AVG (VECTOR)" where VECTOR refers to the column and, thus, this function takes a set of vectors as input. This function computes the average vector across a set of vectors and returns a vector. This function is useful for Word2Vec use-cases (e.g., sentiment analysis across tweets) where every word has a vector and a sentence's vector is computed as the average vector of all words in the sentence or all keywords in the sentence.

Regarding single vector functions, two example functions are as follows: (1) "VECTOR_COUNT_DIMENSIONS (VECTOR)," which counts the number of dimensions in an input vector and returns a number; and (2) "VECTOR_NORM(VECTOR)," which computes the Euclidean norm/length of an input vector and returns a value, such as a BINARY DOUBLE.

The following are examples of queries (in structure query language (SQL) format) using the vector distance function:

```
select id from vector_tab order by VECTOR_DISTANCE(data, :query) asc
fetch first 5
    rows only;
```

This query compares the query vector (": query") with every vector in the table "tab" (where tab has a column named "data" that stores vectors). While a result of this query is 100% accurate, it is relatively slow.

```
select id from tab t where t.attributes.year.number( ) < 2000
    order by VECTOR_DISTANCE(data, :query) asc fetch first 5 rows
only;
```

This query results in obtaining the top five photos that are similar to a query photo (": query") that were taken before the year 2000.

with query as

```
(select id, data from vector_tab where id = :id)
select t.id from vector_tab t, query q where t.id != q.id order by
VECTOR_DISTANCE(t.data, q.data) asc fetch first 5 rows only;
```

This query results in obtaining the top five nearest neighbors to a specific vector in a data set (i.e., vector_tab).

```
select id from vector tab
    where VECTOR_DISTANCE(data, :query, 'MANHATTAN') < 5;
```

This query results in obtaining all neighbors that are within a threshold distance from the query vector (": query"), where the vector distance function specifies a specific distance metric (i.e., Manhattan), thus, overriding the default distance metric.

Vector Storage

Because vectors that are produced by a ML model are of fixed length, an optimal type is used for underlying storage. For example, for vectors that are less than 8K elements in length, RAW may be used, which should handle most use cases. For larger vectors, binary large object (BLOB) may be used. BLOB should not be used for small vectors due to fixed overhead of LOBs. However, whether BLOB or RAW is used has no effect on the user interface.

In an embodiment, additional summary data may be kept within a vector in order to accelerate operations. For example, the squared norm of a vector ($Sum(v^2)$), which is required for distance calculations, may be stored in a header of the vector. A vector may require additional metadata, such as vector version number, whether the vector stores IEEE floats or binary floats, etc.

Flexible Type Specification

In an embodiment, the VECTOR data type is specified with a flexible dimension count and/or a flexible dimension format. Supported dimension formats may include INT8 (1-byte integer), FLOAT16, FLOAT32, FLOAT64, BINARY, and BFLOAT16. An example of a support VECTOR data type specification is the following:

VECTOR or VECTOR(*, *)

In the above example, both the dimension count and the dimension format are flexible. This allows the greatest flexibility. In this way, if another vector with a different dimension count or different dimension format is generated, that vector may be stored with other vectors of different counts and/or dimensions, without having to change any schema or applications that target vectors that are defined accordingly.

```
VECTOR(<dimension count>) or VECTOR(<dimension count>, *)
```

In the above example, the dimension count is fixed, but the dimension format is flexible.

```
VECTOR(*, <dimension format>)
```

In the above example, the dimension count is flexible (and could theoretically be any value), but the dimension format is fixed.

VECTOR(<dimension count>, <dimension format>)

In the above example, both the dimension count and the dimension format are fixed. A specific example of using the VECTOR data type when creating a table is the following:

```
create table vectab (id number, c VECTOR(1024, FLOAT32))
``` where c is the name of a column of data type VECTOR.

Another advantage of a flexible specification is that a user (e.g., database administrator) may choose to partition the data in a table by some relational attributes and each partition can contain vectors of different dimension counts or formats. For example, a user may choose to partition a BOOKS table by the GENRE column. Certain genres like Fiction or Economics might be more popular than genres like Biography. Books of the more popular genres can be vectorized using higher dimension vectors while less popular genres can be vectorized with lower dimension vectors. Using higher dimension vectors to improve searches implicitly assumes that higher dimensional vectors capture more "semantic information." Thus, higher dimension vectors may be used to find matches to a wider array of user searches.

Similarly, users may choose different embedding models for multi-lingual data in the same column. For example, a column may store candidate resumes in different languages. Users may want a Japanese embedding model for resumes in Japanese and an English embedding model for resumes in English. Inherently, these models may produce vectors of different dimension counts or formats. Having a flexible VECTOR column makes it possible to store the vectors from different models in the same column.

A disadvantage of having flexible dimension counts is that vector distance computations cannot be blindly performed on a column containing vectors of different dimension counts. For example, in the book genre example above, a user must add a predicate on the GENRE column to ensure that the search vector is being compared with vectors of the same dimension count.

Distance Operations on Vectors with Different Dimension Formats

However, vector distance operations may be executed on two vectors of different dimension formats. For example, using a new SQL function VECTOR_DISTANCE( ), a distance computation may be performed between a three-dimensional vector of FLOAT32 and a three-dimensional vector of FLOAT64. The following is an example of a data definition language (DDL) statement, a data manipulation language (DML) statement, and a structured query language (SQL) statement, respectively:

```
create table vectab (c1 vector(3, FLOAT32), c2 vector(3, FLOAT64));
insert into vectab values (TO_VECTOR('[1.15,
2.27, 3.34]', 3, FLOAT32),
    TO_VECTOR('[1.234, 2.234, 3.334]', 3, FLOAT64));
select vector_distance(c1, c2) from vectab;
```

In the above example, different columns of the same table store vectors of different dimension formats. In the following example, a single column of a table stores vectors of different formats:

```
create table vectab (id NUMBER, c VECTOR);
insert into vectab values (TO_VECTOR('[1.15, 2.27, 3.34]', 3,
FLOAT32));
insert into vectab values (TO_VECTOR('[1.55, 2.63, 3.71]', 3, INT8)); //
scalar quantized
select id from vectab order by vector_distance(c, TO_VECTOR
(:qv, 3, FLOAT32)) fetch
    first 10 rows only;
```

In an embodiment, when a distance computation is initiated, vectors with the lower precision format are first upconverted to the higher precision format and then the distance computation is performed. In a related embodiment, when a distance computation is initiated, vectors with the higher precision format are first down converted to the lower precision format and then the distance computation is performed. Both abilities add to the advantages of flexibility described earlier.

In a related embodiment, VDBMS 100 allows users to specify whether vectors with the lower precision format are upconverted or vectors with the higher precision format are down converted. There may be a default conversion, such as up conversion. The specification of up conversion or down conversion may be in a vector query (e.g., a select statement), in a create table statement (so that any vector queries on the table follow that particular type of conversion), or in a modify table statement (to change the default conversion setting or to change the previous conversion specification). If the conversion specification is in a vector query, then the vectors in the specified column may remain in their current state, without converting. Thus, a copy of those vectors is made (e.g., in volatile memory) and the vector copies are converted (whether up or down).

Dimension Format Conversion

In an embodiment, a VECTOR constructor (e.g., "TO_VECTOR( )) enables conversion of vectors from a flexible type to a fully declared type, from a fully declared type to a flexible type, or from one dimension format to another dimension format. The following series of database statements create two vector tables, where the first database statement creates a column named "data" of data type VECTOR, but with no specification of dimension number or format, and where the fourth database statement takes that column as input and converts each vector therein (which is of a flexible format type) to a vector that is of the format FLOAT32:

a. create table vectab (id NUMBER, data VECTOR);
b. insert into vectab values (1, '[1,2,3]');
c. commit;
d. create table vectab2 as select id, TO_VECTOR(data, 3, FLOAT32) data2 from vectab;
e. desc vectab2; //This shows data2 column as VECTOR (3, FLOAT32)//

In this example, the vector constructor converts the inserted vector from a flexible type to a fully declared type (i.e., with the number of dimension specified and the dimension format specified). The VECTOR constructor may be used to copy vectors from one column of a table (a) to another column in the table or (b) to a column in a different table. In this example, the vector constructor takes a vector from one table as input and stores the converted vector into another table.

Converting vectors from a flexible type to a fully declared type may be useful in certain scenarios. For example, if a query execution engine knows the size of each vector in a set of vectors, then the query execution engine can create a correctly sized buffer to store vectors for processing. However, if the set of vectors are stored in a column that is a flexible type, then the query execution engine must first analyze each vector to determine its size so that the query execution engine generates a buffer of an appropriate size. This overhead slows down query processing. Also, converting vectors from a flexible type to a fully declared type makes sense if it is known that the embedding model that generates the vectors is not expected to change much in the future, if at all.

Flexible Storage Format

In an embodiment, vectors are stored in objects, such as large objects (LOBs), an example of which is a binary LOB (BLOB). Storing vectors in LOBs allows for storing large vectors, such as vectors with dimensions up to 65,535 dimensions.

In an embodiment, an object that stores a vector is designed to be self-contained, meaning each vector object contains information about the dimension count and/or dimension format of the corresponding vector. This allows any module or application to examine a vector object and precisely interpret the vector without relying on a separate dictionary/catalog table that describes the data type.

In a related embodiment, the format of a vector is designed to cache additional metadata that can be used to accelerate distance computations during run-time. One such metadata is the Squared L2-Norm (Euclidean Norm) of a vector, which norm can be used to speed up Euclidean distance calculations. Given two vectors v1: (x1, y1) and v2: (x2, y2), the Euclidean distance between the two vectors is sqrt ((x1−x2)^2+ (y1−y2)^2). The portion inside the sqrt( ) can be expanded as: $x1^2+x2^2-2x1x2+y1^2+y2^2-2y1y2= (x1^2+y1^2)+(x2^2+y2^2)-2(x1x2+y1y2)$=Squared_Norm (v1)+Squared_Norm(v2)−2 (x1x2+y1y2). Thus, for a given query vector, a one-time computation of the Squared Norm may be computed and, if each vector in a table already has the Squared Norm cached, then the distance computation is reduced by approximately 10%.

In an embodiment, the format of a vector is designed to store the vector's data, including floating point dimension formats, in either IEEE754 format or a proprietary canonical binary float/double format that allows for floating point numbers to be byte-comparable. This byte-comparability may lead to faster searches under some circumstances. For example, a user hand-creates vectors where each dimension corresponds to a human-chosen attribute. Another example, vectors are generated from relational data. Each dimension may correspond to a normalized value for a relational column. In such cases, users may write a custom distance function where this byte-comparable property may be useful. Furthermore, an internal canonical format allows for easy interoperability across platforms and allows vectors to be safely transmitted over a computer network without worrying about endianness impacts.

An example vector format is as follows:

```
[Version # (1B)][Flag (2B)][Num_Dims (1B/2B/4B)][Storage Type
   (1B)][Squared L2-Norm (1B/2B/4B/8B)][Vector Data
   (1B/2B/4B/8B)*num_dims]
``` where each '[ ]' corresponds to a field in a vector object, 'B' refers byte, '1B/2B' means that the corresponding field in a vector may be one byte or two bytes in length, 'Version #' allows the number of dimensions and/or format of a vector to change from version to version, 'Flag' indicates what is stored in vector object (e.g., whether the vector data is big endian or little endian; whether the vector data is floating point in byte-comparable format or IEEE format, which is not byte comparable), 'Num_Dims' refers to number of dimensions in the vector (e.g., if the vector is less than 255 dimensions, then only 1B is needed), 'Storage Type' refers to the dimension format, such as FLOAT32 and INT8, and 'Squared L2-Norm' is the square of the Euclidean distance between the vector and the "zero" vector (or origin). Calculating and storing the squared L2-Norm value within a vector reduces the time to compute a distance between the vector and another vector.

Flexible Storage Format

Even though a VECTOR column may be declared with a flexible specification, a storage engine still stores a fully qualified specification at smaller data granularity, including dimension count, dimension format, etc. Often users specify the VECTOR column as flexible for future-proofing their (e.g., vector search applications), but the vectors that are stored in that column are generated by a single embedding model for all rows, thus having the same dimension count and format. Even though the VECTOR column is flex, the vector metadata may be stored per-row (the default choice), or per-data block, or per-CU. The "smaller data granularity" refers to the fact that the entire column is still flex, but that for subsets of rows, the metadata may be captured.

In an embodiment, a storage engine (e.g., in the background or upon storage) identifies the number of dimensions and dimension format of a set of vectors, generates dimension metadata that reflects that information and stores that dimension metadata separately from the set of vectors. The set of vectors may be stored in a single data block or in a single columnar unit (CU) if table data is stored in a columnar format. The dimension metadata of a set of vectors may be stored in the same data block or CU that stores the set of vectors.

Then, an evaluation engine (that processes vector queries) takes advantage of this dimension metadata to accelerate vector operations, such as vector distance calculations or similarity scores. For example, based on dimension metadata, the evaluation engine knows exactly the location of the start of vector data in each vector object in a data block of CU, as well as the exact length of vector data in each such vector object. With this knowledge, retrieval of vector data may be performed faster because one or more fields of a vector object do not need to be analyzed to determine where to begin reading the vector data. This can decrease vector distance computations by 20%-30%. Also with this knowledge, efficient SIMD (single instruction, multiple data)-optimized batched operations may be performed.

However, if there are one or more vector objects in a data block or CU that have a different dimension count or format than the remaining vector objects, then such per-block or per-CU dimension metadata is not generated and, thus, not available. Therefore, the evaluation engine will default back to per-vector object processing where one or more fields in a vector object must be read in order to determine where the vector data for that vector object is stored.

In a related embodiment, when a set of data blocks storing vector objects are read from non-volatile storage into volatile storage (e.g., in order to execute a vector query), the process reading the set of data blocks analyzes the set of data blocks to determine whether the vector objects stored therein have the same dimension count and same dimension format. This determination may be performed by reading dimension metadata of a data block. Alternatively, this determination may be performed by reading two or more fields of each vector object.

If the vector objects have the same dimension count and same dimension format, then the process creates, in volatile memory, a data structure (which may be a CU) that stores the dimension count and dimension format once for those vector objects and stores the individual vector data from each vector object, and, optionally, the squared L2-norm data from each vector object. The process might not store, in the data structure, other data that is stored within each vector object, such as a flag value and a version number. There may be multiple data blocks in the set of data blocks; thus, a single data structure may correspond to multiple data blocks.

The data structure may comprise: (1) a set of common data (e.g., version number, dimension count, dimension format) that is applicable to all vectors stored in the data structure; (2) a norm array that comprises multiple entries, one for each squared L2-norm value from the set of data blocks; and (3) a vector array that comprises multiple entries, one for each vector data of each vector from the set of data blocks. The data structure may also include (1) a first reference that points to the norm array and (2) a second reference that points to the vector array. With this information, the loading of SIMD registers can be very fast since each vector object does not have to be analyzed thoroughly to locate the vector data at query execution time.

Vector Checks

With the storage of flexible type vectors, users may desire to know the characteristics of such vectors, whether they are stored in non-volatile storage (e.g., on disk) or in volatile storage. In an embodiment, one or more new operators are defined that allow users to check one or more characteristics of a vector or a set of vectors. Examples of new operators include:

CHECK (veccol IS_VECTOR DIMENSION (1024, FLOAT32))
CHECK (veccol IS_VECTOR DIMENSION (1024))
CHECK (veccol IS_VECTOR DIMENSION (*, INT8))

The first example operator returns true if an input vector (or set of vectors) has 1024 dimensions and a dimension format of FLOAT32. The second example operator returns true if an input vector (or set of vectors) has 1024 dimensions; the dimension format is not considered in determining whether to return true or false. The third example operator returns true if an input vector (or set of vectors) has a dimension format of INT8; the dimension count is not considered in determining whether to return true or false.

In an embodiment, a dimension check is performed on a per-vector basis. For example, a vector identifier may be passed as a parameter of the dimension check operator. In a related embodiment, a dimension check is performed on a set of vectors, such as all vectors in a column or all vectors in a data block.

In a related embodiment, a dimension check is performed while vectors are loaded into a table. Thus, some vectors may satisfy this dimension check while other vectors do not.

Examples of database statements that use a dimension check operator are the following:

```
create table vectab (id NUMBER, data VECTOR CHECK(data
IS_VECTOR (1024,
    FLOAT32)));
alter table vectab modify column (data CHECK (data IS_VECTOR
(1024));
```

If the CHECK operator in the first database statement returns false (i.e., the check constraint fails), then an error is raised and the vector is not added. This is the same behavior with a fully qualified VECTOR column. However, a difference is that application flexibility is still retained with the CHECK constraint approach vs fully qualified VECTOR column approach. For example, the following DDL statements are received:

```
create table mytab (id number, data VECTOR);
alter table mytab modify column (data CHECK (data IS
    VECTOR(1024, FLOAT32));
```

The first DDL statement creates a flexible VECTOR column. The second DDL statement validates whether all data in the column up to this point satisfies the constraint and also ensures that future insertions follow this constraint. Then, vectors with that shape (i.e., dimension count and format) from a particular embedding model are inserted into that column. An application still treats this column as a flexible VECTOR type column. Then, DDL statements are received in order to insert vectors from a different embedding model where the embeddings have a different shape.

```
delete from mytab;
alter table mytab modify column (data CHECK (data IS
    VECTOR(384, INT8));
```

(The delete statement is meant to remove all existing vectors in the table, so that the application can now insert vectors of a different shape that adheres to the new CHECK constraint.) The vectors from that different embedding model with a dimension count of 384 and a dimension format of INT8 are inserted into that column. The application does not need to change. However, if the column was a fully-qualified VECTOR column, then the old VECTOR(1024, FLOAT32) column would have to be dropped and a new VECTOR(384, INT8) column created.

While having a flexible type vector column is useful for application development so that applications that read from (or write to) that column do not need to be aware of the dimension count/dimension format, knowing that all vectors have the same number of dimensions and/or dimension format can speed up vector query compilation and execution. If all vectors have the same metadata, then that metadata would only need to be read once; else, each vector must be read, requiring time and CPU and potentially wasting space or having to grow an approximately sized buffer. Further, if the vectors have the same metadata, then the vector payload will be at a fixed offset from the start of the vector. Thus, the offset is computed only once and the vector data may be accessed quickly. Therefore, using a dimension CHECK constraint is useful to verify that vectors in a column have the same number of dimensions and/or format.

In an embodiment, a dimension check operator is used to limit which vectors are returned in a vector query. Example database statements include the following:

```
create myview vectab_FLOAT32_only as select id, data
    from vectab where
```

```
VECTOR_DIMENSION_COUNT(data) = 1024;
select id from myview order by vector_distance(:qv,
data) fetch first 10 rows only;
```

The first database statement creates a view named "vectab_FLOAT32_only" that is a subset of the table 'vectab.' The view contains only vectors that have a dimension count of 1024. Therefore, if the table 'vectab' includes one or more vectors that have a different dimension count, then the view will not include those one or more vectors. The second database statement is a vector query that includes a query vector named ': qv' and selects, from the view, ten identifiers whose corresponding vectors are closest to the query vector.

A vector query may include a dimension check operator. An example of such a vector query is as follows:

```
select id from vectab where vector_dimension_count(data) = 1024 order
by
    vector_distance(data, :query_vec) fetch first 10 rows only;
```

This vector query may treat the dimension count as a predicate, and therefore, will ignore all vectors that do not match the dimension count. This is just as any other predicate would be applied to table rows.

In processing a vector query with a dimension check operator, encountering a vector that does not have the dimension characteristic (whether count or format) that is specified in the dimension check operator may be handled in one of two ways. In a first way, as the example above describes, any such vectors in the vector column that do not have that dimension characteristic are ignored. Therefore, a vector distance operation may be performed on a potentially small number of vectors that have the specified dimension characteristic. In a second way, the first vector that is encountered (e.g., by a compilation engine or an execution engine) that does not have the specified dimension characteristic causes the vector query engine to cease processing the vector query and, optionally, display an error message. The different ways may be specified in the vector query. One of the two ways may be a default way.

Additional Embodiments

In an embodiment, VDBMS 100 supports one or more of the following operators.

VECTOR_DIAG( ) operator dumps vector binary in a user-consumable form for diagnostic purposes.

TO_VECTOR( ) or VECTOR( ) constructor may accept a VECTOR payload as a BLOB and verify whether it is a properly constructed vector.

VECTOR_SERIALIZE( ) or FROM_VECTOR( ) has an option to return the vector payload as a BLOB with the raw bytes instead of a comma-separated string. For example, "FROM_VECTOR(veccol RETURNING BLOB)"

In an embodiment, BINARY vectors are packed UINT8 values. In other words, eight dimension values of 0/1 is converted to a 1B unsigned integer. Therefore, in this embodiment, the array representation for a BINARY vector is not [1, 1, 0, 0, 1, 0, 0, 1, . . . ], but rather [201, . . . ].

The VECTOR_SERIALIZE( ) or FROM_VECTOR( ) functions provide the user flexible options to either return the fully expanded binary 0/1 text array, or the packed UINT8 array.

Versioning of Vectors

An important piece of an AI Vector Search eco-system is the ability to update the embedding model that is used to vectorize (e.g., unstructured) data. As this space is rapidly evolving, it is possible that embedding models of the future produce vectors of different dimension counts and/or different dimension formats. Having a flexible VECTOR column type allows users to update the vector column by replacing vectors from an old model with a new model. While functionally valid, this approach may prove to be expensive, especially for large datasets with hundreds of millions of vectors. In particular, all vectors in the table for a specific column must be updated with vectors from the new model in a single transaction before new searches can leverage them. Such an update could take hours.

Also, users may want to experiment with different embedding models to decide which model's vectors provide the best semantic search quality. One idea is to create multiple columns, one for each embedding model. However, this requires creating multiple versions of the application that references different vector columns in Top K queries.

In an embodiment, multiple versions of a vector are stored in the same object. Storing multiple versions of a vector in the same object addresses problems of both approaches (of (i) replacing old vectors with new vectors and (ii) creating a column for each embedding model). An object may be a LOB (or large object), an example of which is a binary LOB (BLOB). Relatively small vectors may also be stored in RAW columns.

Figure 2:
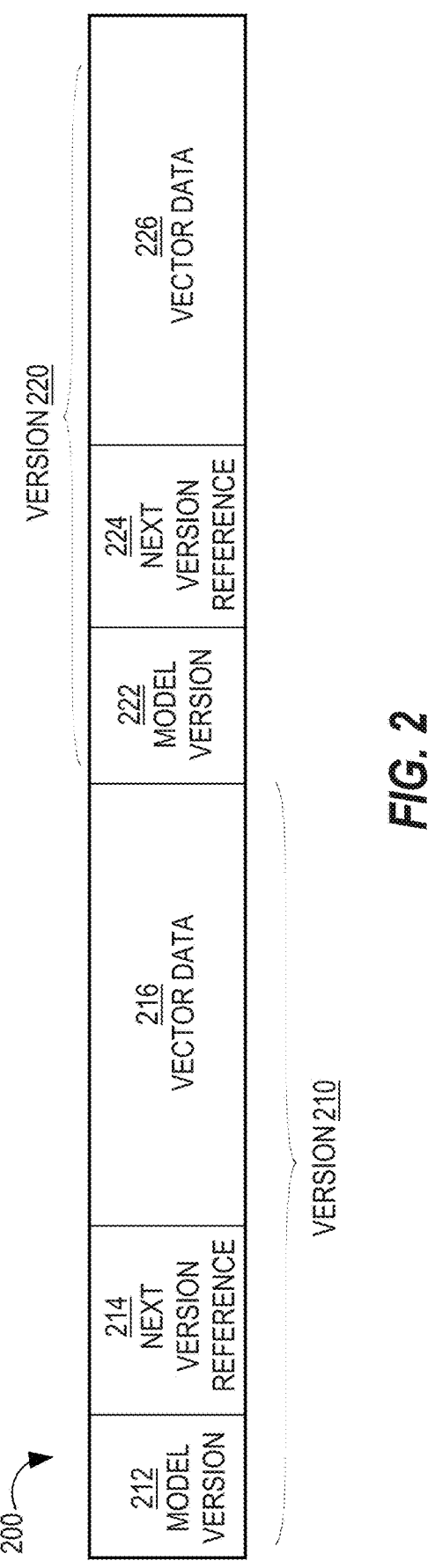
FIG. 2 depicts an example vector object, in an embodiment.

From a storage perspective, there are two main options to store multiple versions of a vector in a single object (e.g., a BLOB): (1) storing the different versions in a linked-list style format within the BLOB format and (2) leveraging vector-only extents. Regarding the first option, FIG. 2 depicts an example vector object 200, in an embodiment. Vector object 200 comprises two versions (210 and 220) of a vector. Data for each version comprises three fields: a model version number, a next version reference that points to the next version in the same object, and the vector data itself of that version. Therefore, data for the first version 210 comprises model version number 212, next version reference 214 (which references version 220), and vector data 216. Similarly, data for the second version 220 comprises model version number 222, next version reference 224, and vector data 226. Vector data 216 stores the embedding data for version 210 while vector data 226 stores the embedding data for version 220.

Thus, a next version reference field stores a value that indicates a location where data about another version is stored. The value may be a byte offset into the version object. The last (in order) version in a vector object may have a value of zero or null in its next version reference field, which value indicates that there are no more versions of the vector that follow that last version.

The model version number of a version may be a number that is automatically set by the process (e.g., a version adding component) that inserts the version into a vector object. The model version number may be a monotonically increasing value. For example, the first version of a vector is assigned model version '0', the second version of the vector is assigned model version '1' and so forth. Alternatively, the model version number may be (a) a value that corresponds to the embedding model that generated the version or (b) a name of that embedding model. In either scenario, vector database 120 stores a mapping (which may be read into memory of vector database server 110) that maps embedding model names/identifiers to their respective model version numbers that are stored in vector objects in vector database 120.

Versioning of Vectors: Retrieving a Version

A version retrieval component retrieves one or more versions of a vector from a vector object. The version retrieval component may be implemented in software, hardware, or any combination of software and hardware. The version retrieval component may be part of a vector database server 110 and may be called by a vector search application. Alternatively, the version retrieval component may be part of a storage sub-layer that is distinct from a database server layer that receives vector search queries. For example, the version retrieval component may be part of vector database 120. The more processing that is pushed to vector database 120, the less data that needs to be transferred to vector database server 110.

The version retrieval component may determine which version(s) to retrieve based on one or more inputs (e.g., from a user or a vector search application). For example, a user specifies which version of a vector is desired, such as "version0," "version1," "3," etc. A version specification may be passed as input to an application that processes versioned vectors.

Additionally or alternatively, the version retrieval component retrieves the most recent version of a vector by default. Thus, no input specifying which version(s) to retrieve may be necessary. In this way, if a user/application does not specify a version number, then it is presumed that the user/application desires the most recent version.

In a related embodiment, new SQL syntax is provided to allow users to specify which version of a vector is desired. For example, the vector distance function may be augmented to allow for flexible version specification, such as the following:

---

VECTOR_DISTANCE(<vec_col1>, <vec_col2>, <distance metric>, <version number of
    vec_col1>, <version number of vec_col2>)

---

The version numbers may be bind values that an application can change.

Figure 3:
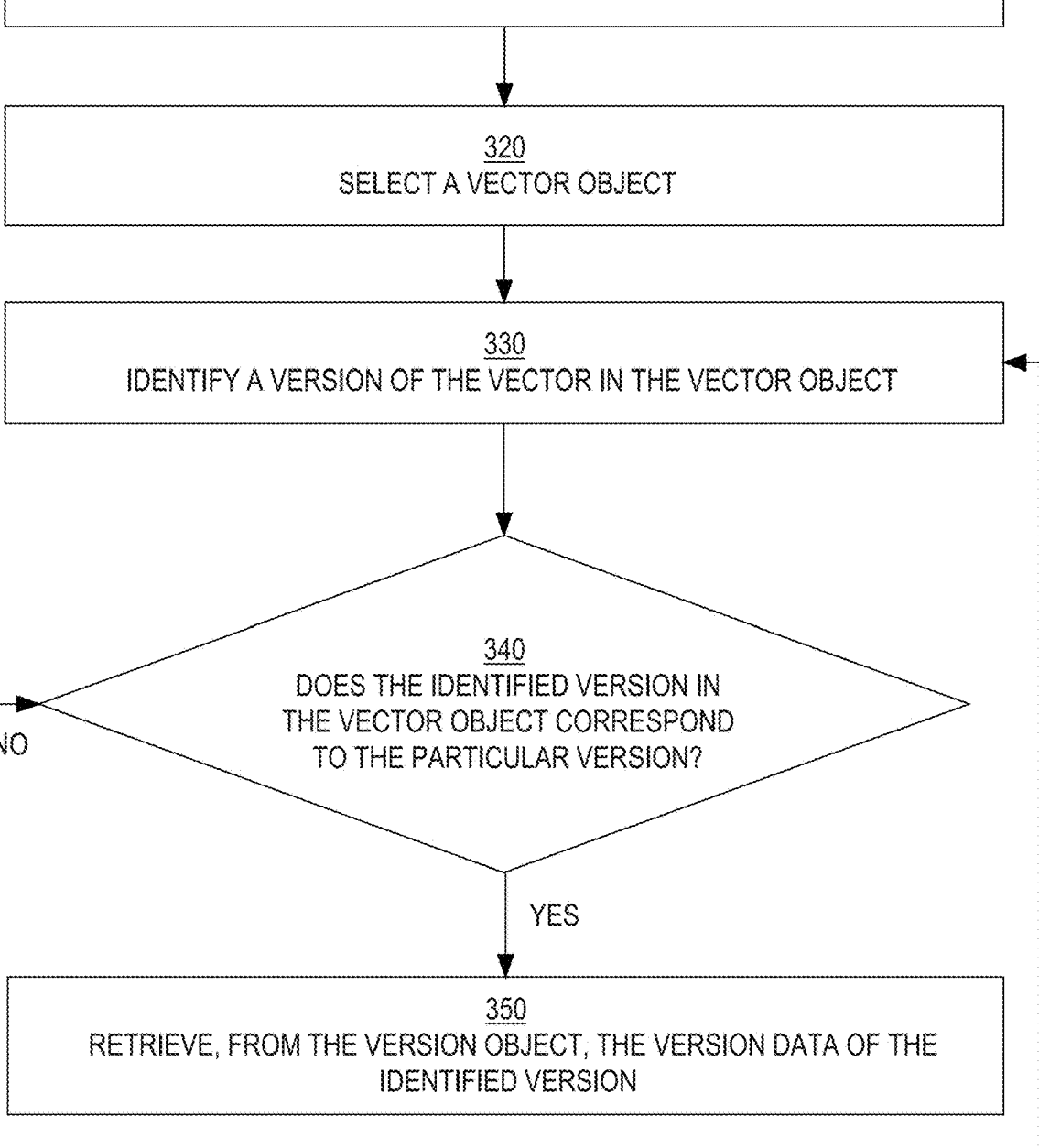
FIG. 3 is an example process for retrieving a version of a vector from a vector object, in an embodiment.

FIG. 3 is an example process 300 for retrieving a version of a vector from a vector object, in an embodiment. Process 300 may be performed by a version retrieval component.

At block 310, a particular version of a vector is identified. The particular version may be specified by a user. Alternatively, the particular version may be a default version, such as the oldest version or the newest (or most recent) version. Different API calls to the version retrieval component may indicate which version. For example, one API call may be associated with a request to retrieve the oldest version of a vector while another API call may be associated with a request to retrieve the newest version of a vector. Alternatively, only a single API call is used to initiate the version retrieval component and one or more values that are passed as part of the API call indicate which version(s) to retrieve.

At block 320, a vector object is selected. Block 320 may involve selecting multiple vector objects. A vector object may be selected based on applying one or more search criteria to one or more columns of a table that stores vectors. Block 320 may be performed before or after block 310.

At block 330, a version in the vector object is identified. The first iteration of block 330 may involve identifying the first version (sequentially speaking) in the vector object. The second iteration of block 330 may involve identifying the next version in the vector object, which is after the first version, using the next version reference field value identified in block 360.

At block 340, it is determined whether the identified version in the vector object corresponds to the particular version that was identified in block 310. Block 340 may involve comparing the particular version (identified in block 310) with the value in the model version field of the identified version. If the determination in block 340 is in the affirmative, then process 300 proceeds to block 350. Otherwise, process 300 proceeds to block 360.

At block 350, the version data of the identified version is retrieved from the version object. The version data may be identified based on (1) first data that indicates an offset into the vector object where the version data begins and (2) second data that indicates a length (e.g., in bytes) of the version data. Thus, the vector data between (a) a first location indicated by the first data and (b) a second location indicated by a combination of the first data and the second data (e.g., first data+second data) is retrieved.

After block 350, if multiple versions of the vector are requested, then process 300 may return to block 310 where another version is identified. For example, a request to the version retrieval component may specify versions 4 and 5 or the second version and the most recent version. Therefore, process 300 may be performed once for each requested version.

At block 360, a location of the next vector data within the vector object is identified. This location may be identified using the value in the next version reference field of the identified version (identified in block 330). Process 300 then returns to block 330. However, if the value in the next version reference field indicates that there are no versions, then process 300 may return an error or return a value indicating that the particular version is not available.

In a scenario where the version retrieval component receives a request to identify and return the most recent version of a vector from a vector object and the most recent version is stored at the beginning of the vector object at a position that is known without having to scan the vector object (e.g., because the first version in a vector object is always stored at offset six bytes from the beginning of the vector object), then identifying the most recent version involves identifying that byte offset into the vector object and returning the bytes between (1) the byte offset and (2) a location identified by the sum of (i) the byte offset and (ii) the length of the vector data of the most recent version.

Versioning of Vectors: Deleting Particular Versions

In an embodiment, a request or instruction is received to delete a particular version of multiple vectors. For example, a software engineer may decide that the embedding model that generated the most recent versions of a set of vectors performed poorly in one or more tests. In order to free up space in non-volatile, or persistent, storage, the most recent versions of the set of vectors are deleted.

Deleting a particular version of a multiple vectors may involve receiving an instruction that indicates the particular version (e.g., the first version or the most recent version or a value that indicates a particular number). The instruction may also specify a table or a column within the table that stores the vectors. In this way, the set of vectors involved may be inferred. For each vector object in the table or column, a version deletion component (e.g., of vector database server 110 or of vector database 120) determines the version in the vector object (logical or physical, which is described in more detail herein) that matches the particular version and either (i) deletes the embedding data of that version or (ii) sets a flag that indicates that the space occupied by the embedding data is reusable. If future versions are expected, then approach (ii) may be preferred since the space has already been allocated.

In a related embodiment, an instruction or request to delete may specify or otherwise indicate multiple versions. For example, an instruction may be to delete versions two and four, or to delete the last two versions.

Versioning of Vectors: Adding New Versions

In an embodiment, adding a new version to a vector object that comprises one or more versions involves appending the new version to the one or more versions. Such adding is efficient with relatively low overhead. Adding a new version may involve traversing one or more next version reference fields in a vector object. For example, once a version object is identified, a version adding component identifies a next version reference field in the data for the first version (sequentially) in the version object. The version adding component uses the value in the next version reference field to identify the second version (sequentially) in the vector object, if the second version exists. This process continues until the version adding component identifies, within the vector object, a next version reference field that contains a value that indicates that there are no more versions in the vector object. The version adding component identifies a position within the vector object to which the new version may be added. That position is the byte that follows the last byte of vector data in the vector object.

In adding a new version of a vector to a vector object, the version adding component also adds a value to a model version number field for the new version, the value indicating the version of a model that generated the new version. The version adding component may also add a value for the next version reference field. When appending a new version to a version object, this value may be zero or null, indicating that there are no more versions after this new version.

However, appending versions to one or more versions in a vector object may cause (due to data block size limitations) the most recent version to be stored in a different data block than the data block that stores the one or more versions. Therefore, when retrieving the most recent version, a version retrieval component must follow one or more references to arrive at the different data block to retrieve that version. Accessing two or more data blocks to retrieve the proper version of a vector may increase latency substantially. Fitting as many versions of a vector into a single data block is preferrable for use cases where there is significant traversing of versions involved.

In a related embodiment, a vector object includes a most recent reference field that includes a reference or pointer to the most recent version of the vector represented by the vector object. This most recent reference field may be the first field in the vector object or one of the first few fields in the vector object, which field may be easily and quickly identifiable, such as N bytes from the beginning of the vector object. In this way, retrieving the most recent version of a vector may only require following at most one reference, even though there may be many versions of the vector that are stored in the vector object.

In another embodiment, a new version is prepended to a vector object that comprises one or more versions. Such prepending may require shifting existing contents of the vector object to later offsets or positions within the vector object. Shifting may comprise copying existing contents (e.g., vector data of multiple versions of a vector, model version numbers, and next version reference values) of the vector object, determining a byte offset in the vector object, and storing the copied contents beginning at the byte offset, whether in the same data block or a new data block. Determining the byte offset may involve determining the size (e.g., in bytes) of the new version, determining the size (e.g., in bytes) of any required fields that are to accompany the new version (such as a model version number field and a next version reference field) and totaling/summing those two sizes to compute the byte offset.

Prepending a new version to a vector object also involves generating a value for a next version reference field of the new version and storing that value in that next version reference field. The value in this next version reference field points to the most recent version (before the new version) that was added to the vector object. The first time a version of a vector is stored in the vector object, the value of the next version reference field may be zero or null, indicating that there are no more versions sequentially after the first version is added to the vector object. Thereafter, the value of the next version reference field for the new version may be the size of the new version plus zero or more pre-defined offsets.

Similarly, for inserting vectors, new DDL may be used to specify the version into which to insert the vectors. There are at least two techniques to specify which version is to be updated or retrieved. A first technique is to use a SQL construct to specify which version is of interest. For example, in order to update a value of the fourth version of a vector using JSON-like interpretation, the following statement may be used:

update mytab set veccol=VECTOR_TRANSFORM(vec-
        col, SET '$[4]'='[1.1, 2.2, . . . ]')

As another example, in order to retrieve the third version using JSON-like interpretation, the following statement may be used:

select   FROM_VECTOR(VECTOR_VERSION(veccol,
        '$[3]')) from mytab;

A second technique is to create a DDL that defines the currently accepted version across sessions. For example, in order to make the third version the default version for any application that accesses the corresponding column, the following statement may be used:

alter table mytab modify column (veccol current_version
        3);

With this added metadata associated with the vector column, when inserting vectors into that column, the following statement may be used to automatically update vector column payloads to add the third version:

insert into mytab values ('[3.1, 3.2, 1.0]');

The alter table statement above works with reads and writes. Thus, queries on this column will read the third version. The following alter table statements are specifically only for reads and writes, respectively:

alter table mytab modify column (veccol current_
        read_version 3);
    alter table mytab modify column (veccol current_
        write_version 3);

If an alter table statement sets the version to 3 and there are no versions 1 and 2, then a subsequent insert may simply insert the new payload into version 3 and have implicit NULLs for versions 1 and 2. Alternatively, an error may be thrown in case a vector has no explicit values for versions 1 and 2.

An advantage with this embodiment is that the new vectors can be added in a rolling/online fashion where the application can continue to use old vectors while the new vectors are added over time. For example, a vector column has version 1 for all rows. An application is running searches against version 1. Then, a user (e.g., database administrator (DBA) decides to try out a new embedding model and creates version 2 for all vectors. A parallel session can now generate vectors that get added as version 2 to every row. This can be done in batches of, for example, 100 rows, such that it is not an all-or-nothing decision. The entire table can get version 2 vectors across many transactions. The online nature is highlighted by the fact that the existing application can continue reading version 1 for its searches, even though some (or all rows) have version 2 added. Further, other non-vector transactions can happen concurrently since version 2 can be generated in batches.

Contrast this with a solution where the VECTOR column is not versioned and the DBA must update a non-versioned vector, i.e., all version Is must be replaced with version 2s.

This can be done with an update statement. If the update statement updates all rows in the dataset in a single transaction, then a mechanism of snapshot isolation provides a similar online behavior. All new versions will be part of a single active transaction. Queries will roll it back as part of Consistent Read image construction (because the transaction is active) and can read version 1. (This may be a standard mechanism for allowing reads while DMLs are in progress). Note that this only works if all rows are updated in the same transaction. If this is done in batches, then a situation may arise where rows 1 to 1M (one million) have version 2 vectors and rows 1M to 1B (one billion) have version 1 vectors, resulting in queries having wrong results. However, updating a 1B row table in a single transaction is not conducive for many reasons. The instance could crash before all 1B rows can be updated leading to wasted work. Embedding generation is expensive, both from a time and money perspective. Thus, re-generating the embeddings is not efficient. The transaction needs to keep row locks on modified rows which means no other transactions can modify the same rows (for example, to change a different relational column). Since the entire transaction could be very long, other writes may be stalled in the system, even though reads are fine.

Process Overview

FIG. 4 is a flow diagram that depicts an example process 400 for storing multiple versions of a vector into a single vector object, in an embodiment. Process 400 may be performed, at least in part, by the version adding component, which may be part of vector database server 110 or vector database 120.

At block 410, a first version of a vector is stored in a vector object. The first version may have been generated by a first embedding model (e.g., a neural network) and stored in a row of a table with a column for storing objects of the VECTOR datatype. The vector object may be a BLOB object.

At block 420, a second version, of the vector, is identified. The second version is different than the first version and is not yet stored in the vector object. The second version may have been generated by a second embedding model after the vector object was created and after the first version of the vector was stored in the vector object. Block 420 may involve identifying the second version immediately after the second version is generated.

At block 430, an instruction to store the second version in the vector object is received. The instruction may have originated from a storage application that transmitted the instruction to a vector database server, such as a vector database server 110. Alternatively, the instruction may originate from the vector database server and be received at a storage layer of vector database 120.

At block 440, in response to receiving the instruction, the vector object is identified. The instruction may include a row identifier that uniquely identifies a row in which the vector object is stored. Alternatively, the instruction may include other data (such as a combination of data values) that is used to uniquely identify a row.

At block 450, the vector object is updated to include the second version in addition to the first version. Block 450 may involve appending, within the vector object, the second version to the first version. Alternatively, block 450 may involve prepending the second version to the first version.

At block 460, a value that indicates a location, within the vector object, of the first version or of the second version is inserted into a next version reference field of the vector object. Block 460 may be part of block 450 in that, during the update, other data may be inserted into the vector object. Other data may include this value for a next version reference field, as well as a model version number (or identifier) that identifies (and/or is mapped to) an embedding model that generated the second version.

Vector-Only Extents: Logical Vector Objects

As noted above, there are two main options to store multiple versions of a vector. FIG. 2 depicts a first main option (i.e., a linked-list style format) while vector-only extents are a second main option. An extent is a logical unit of database storage space allocation made up of a number of contiguous data blocks.

In an embodiment, the versions of a vector object may be physically stored in one or more vector extents, where a vector-only extent only contains vector data, including a vector embedding of a version of a vector. Thus, each vector version is stored in blocks allocated for vector-only extents. A vector-only extent might store vector versions from different vector objects. For example, vector-only extent E1 stores {Vector Object #1, Version #1}, {Vector Object #1, Version 2}, {Vector Object #2, Version 2}, and another extent E2 stores {Vector Object #1, Version 3}, {Vector Object #2, Version 1}, {Vector Object #2, Version 3}.

Figure 5:
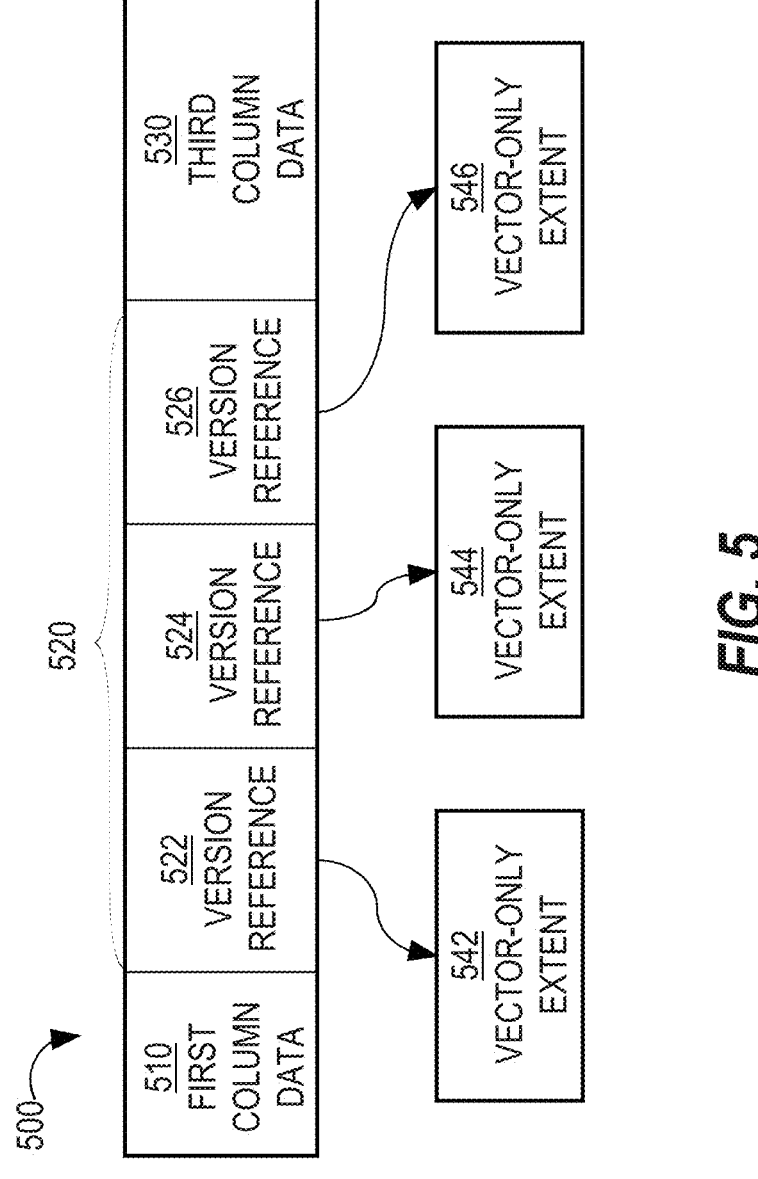
FIG. 5 is a diagram that depicts an example row of a table with a vector column that contains references to versions of a vector, in an embodiment.

FIG. 5 is a diagram that depicts an example row 500 of a table with a vector column 520 that contains references 522-526 to versions of a vector, in an embodiment. Row 500 includes a first column 510 (e.g., a name), vector column 520 (which is the second column in the table), and a third column 530 (e.g., an employment start date). The contents of first column 510 are stored in first column 510, the contents of third column 530 are stored in third column 530, but the vector embeddings associated with vector column 520 are stored in one or more vector objects (or "vector-only extents") that are stored separate from vector column 520. Instead, vector column 520 stores version references 522-526, each referencing a separate version of a vector. Each separate version of the vector is stored in a different (physical) vector-only extent, i.e., vector-only extents 542-546. Thus, a single row in the table comprises contents from first column 510, a set of versions references, and contents from third column 530.

A single vector-only extent may store multiple vector embeddings of one or more vectors. For example, the first two versions of a vector are stored in one vector-only extent, while a third version of the vector is stored in a different vector-only extent.

In this embodiment, vector column 520 does not physically contain vector embedding data (which is stored in vector-only extents 542-546), only non-vector embedding data, such as version references 522-526. Each version reference may be the same fixed size.

In a related embodiment, vector column 520 also stores a model version number for each version reference. These model version numbers may be used by a version retrieval component to identify the requested version of a vector. Similar to the process above for adding new versions of a vector to a vector object, when new versions are added to a logical vector object, version references associated with the versions may be appended to one or more existing version references in the logical vector object, prepended to the one or more existing version references, or added using a different technique.

In this embodiment where a version column contains version references instead of the actual vector embeddings, because many version references may fit into a single column, a version retrieval component must follow at most a single version reference to retrieve a vector-only extent that contains the vector embedding data for a requested version of a vector. When identifying a particular version of a vector, the process that is attempting to read the particular version may scan each version reference sequentially in order to locate the appropriate version reference. Alternatively, the process may know the version number of the particular version and, based on that version number, know which version reference to retrieve without having to scan each version reference sequentially. For example, the process may determine that the version number is '3' and, knowing that each version reference is N bytes, reads the version reference at $(3-1)*N$ bytes from the beginning of the set of version references (where 0 bytes from the beginning of the set of version references is the start of the value for the first version reference).

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
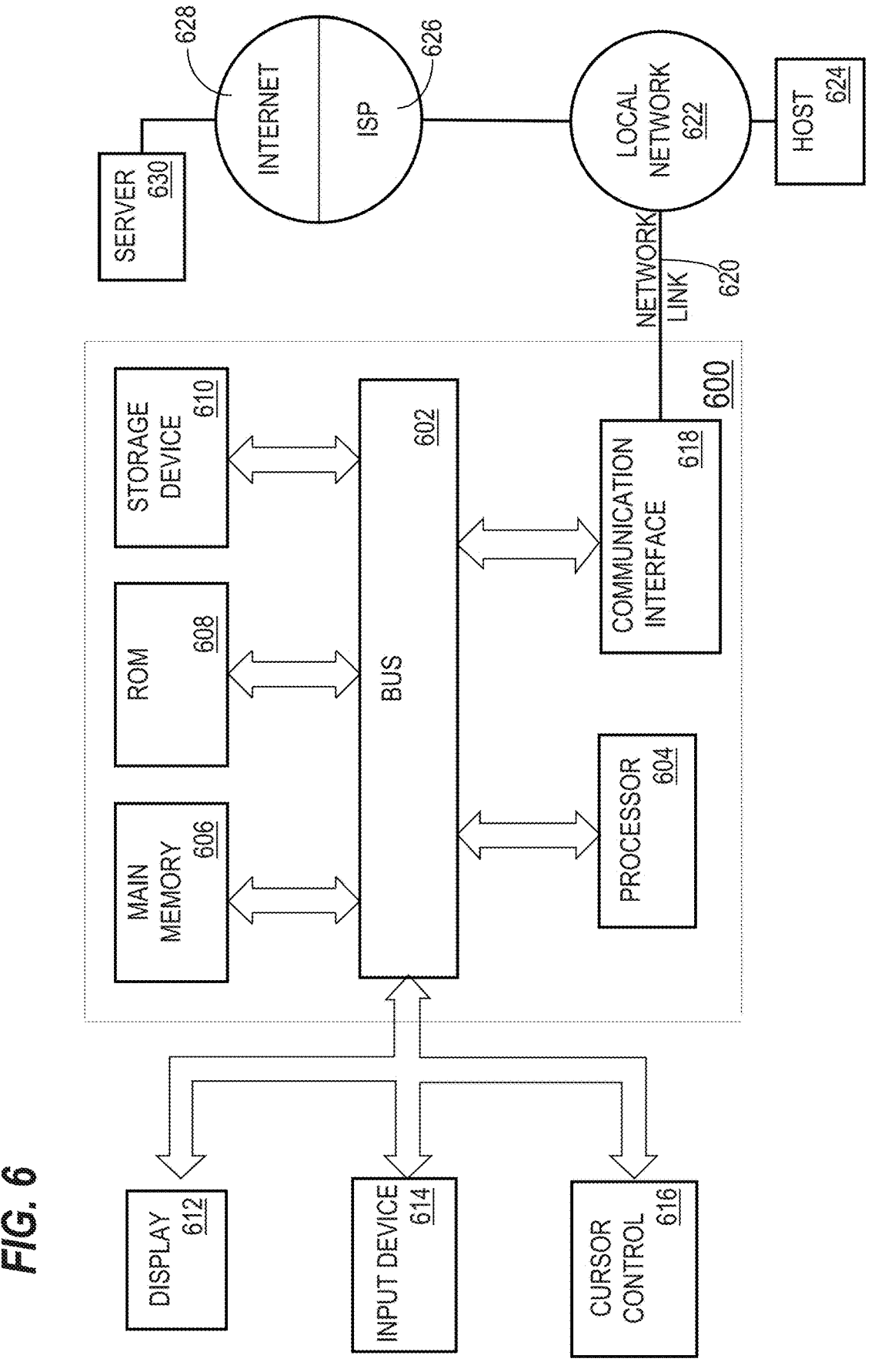
FIG. 6 is a block diagram that illustrates a computer system upon which an embodiment of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic, or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the worldwide packet data communication network now commonly referred to as the "Internet" 628. Local network 622 and Internet 628 both use electrical, electromagnetic, or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

Software Overview

Figure 7:
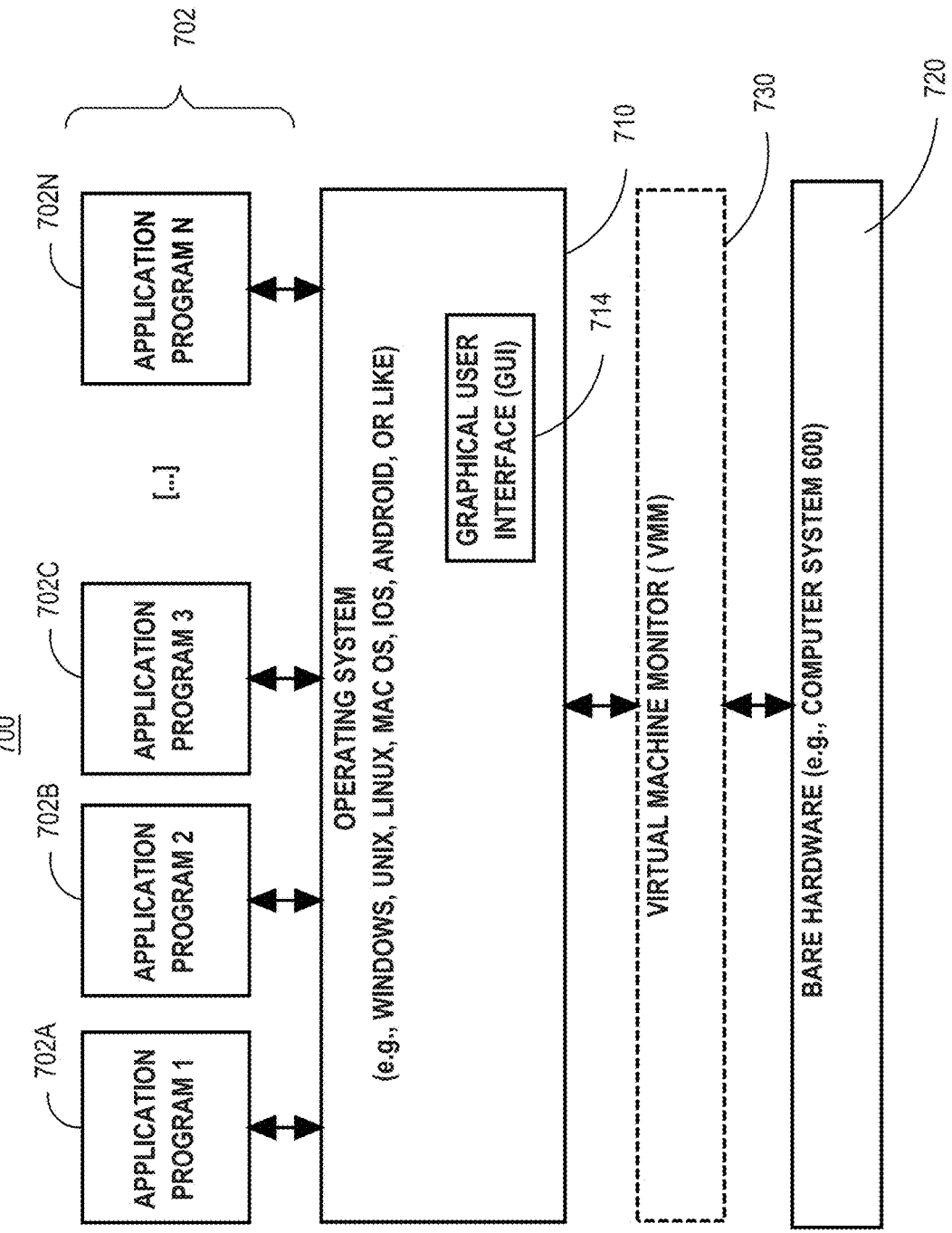
FIG. 7 is a block diagram of a basic software system that may be employed for controlling the operation of the computer system.

FIG. 7 is a block diagram of a basic software system 700 that may be employed for controlling the operation of computer system 600. Software system 700 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 700 is provided for directing the operation of computer system 600. Software system 700, which may be stored in system memory (RAM) 606 and on fixed storage (e.g., hard disk or flash memory) 610, includes a kernel or operating system (OS) 710.

The OS 710 manages low-level aspects of computer operation, including managing execution of processes, memory allocation, file input and output (I/O), and device I/O. One or more application programs, represented as 702A, 702B, 702C . . . 702N, may be "loaded" (e.g., transferred from fixed storage 610 into memory 606) for execution by the system 700. The applications or other software intended for use on computer system 600 may also be stored as a set of downloadable computer-executable instructions, for example, for downloading and installation from an Internet location (e.g., a Web server, an app store, or other online service).

Software system 700 includes a graphical user interface (GUI) 715, for receiving user commands and data in a graphical (e.g., "point-and-click" or "touch gesture") fashion. These inputs, in turn, may be acted upon by the system 700 in accordance with instructions from operating system 710 and/or application(s) 702. The GUI 715 also serves to display the results of operation from the OS 710 and application(s) 702, whereupon the user may supply additional inputs or terminate the session (e.g., log off).

OS 710 can execute directly on the bare hardware 720 (e.g., processor(s) 604) of computer system 600. Alternatively, a hypervisor or virtual machine monitor (VMM) 730 may be interposed between the bare hardware 720 and the OS 710. In this configuration, VMM 730 acts as a software "cushion" or virtualization layer between the OS 710 and the bare hardware 720 of the computer system 600.

VMM 730 instantiates and runs one or more virtual machine instances ("guest machines"). Each guest machine comprises a "guest" operating system, such as OS 710, and one or more applications, such as application(s) 702, designed to execute on the guest operating system. The VMM 730 presents the guest operating systems with a virtual operating platform and manages the execution of the guest operating systems.

In some instances, the VMM 730 may allow a guest operating system to run as if it is running on the bare hardware 720 of computer system 600 directly. In these instances, the same version of the guest operating system configured to execute on the bare hardware 720 directly may also execute on VMM 730 without modification or reconfiguration. In other words, VMM 730 may provide full hardware and CPU virtualization to a guest operating system in some instances.

In other instances, a guest operating system may be specially designed or configured to execute on VMM 730 for efficiency. In these instances, the guest operating system is "aware" that it executes on a virtual machine monitor. In other words, VMM 730 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

The above-described basic computer hardware and software is presented for purposes of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements.

For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
receiving a table specification that specifies a column having a VECTOR data type;
creating a table based on the table specification, wherein the table includes the column having the VECTOR data type;
storing, in the column, a first vector that has a first number of dimensions and a first dimension format;
storing, in the column, a second vector that has a second number of dimensions and a second dimension format;
wherein the first number of dimensions is different than the second number of dimensions or the first dimension format is different than the second dimension format;

wherein the method is performed by one or more computing devices.

2. The method of claim 1, wherein the first number of dimensions is different than the second number of dimensions and the first dimension format is different than the second dimension format.

3. The method of claim 1, wherein the table specification does not specify a number of dimensions for vectors that will be stored in the column.

4. The method of claim 1, wherein the table specification does not specify a dimension format for vectors that will be stored in the column.

5. The method of claim 1, wherein a third vector has a third number of dimensions and a third dimension format, wherein a fourth vector has the third number of dimensions and a fourth dimension format that is different than the third dimension format, the method further comprising:
receiving a vector query that results in a comparison between the third vector and the fourth vector;
in response to receiving the vector query:
converting the dimension values in the fourth vector to the third dimension format to generate a temporary version of the fourth vector;
performing the comparison between the third vector and the temporary version of the fourth vector.

6. The method of claim 1, further comprising:
receiving a second table specification that specifies a second column having the VECTOR data type, wherein the second table specification does not indicate a dimension count or a dimension format for vectors that will be stored in the second column;
storing a first plurality of vectors in the second column;
receiving a database statement that includes an operator that specifies, as input, the first plurality of vectors and a dimension format, and outputs a second plurality of vectors that correspond to the first plurality of vectors and whose dimension values are of the dimension format.

7. The method of claim 1, wherein:
storing the first vector comprises storing the first vector in a first vector object that specifies the first number of dimensions and the first dimension format;
storing the second vector comprises storing the second vector in a second vector object that specifies the second number of dimensions and the second dimension format.

8. The method of claim 7, further comprising:
generating a Euclidean norm based on dimension values of the first vector;
wherein storing the first vector in the first vector object comprises storing the Euclidean norm in the first vector object.

9. The method of claim 1, further comprising:
storing, in one or more data blocks in persistent storage, a plurality of vector objects of a flexible type;
determining whether each vector object in the one or more data blocks has the same dimension count and the same dimension format;
in response to determining that each vector object in the one or more data blocks have the same dimension count and the same dimension format:
generating metadata that indicates the dimension count and the dimension format;
associating the metadata with the plurality of vector objects.

10. The method of claim 9, further comprising:

generating, in volatile memory, a data structure that includes vector data from each vector object in the plurality of vector objects;

wherein associating the metadata with the plurality of vector objects comprises including the metadata in the data structure.

11. The method of claim 1, further comprising:

receiving a database statement that indicates a vector column and includes a check dimension operator that specifies a dimension count or a dimension format;

in response to receiving the database statement, verifying whether each vector in the vector column has the dimension count or the dimension format.

12. The method of claim 1, further comprising:

receiving a database statement that indicates a vector column and includes a check dimension operator that specifies a dimension count or a dimension format;

for each vector of the one or more vectors, loading said each vector into the vector column only in response to determining that said each vector has the dimension count of the dimension format.

13. One or more non-transitory storage media storing instructions which, when executed by one or more computing devices, cause:

receiving a table specification that specifies a column having a VECTOR data type;

creating a table based on the table specification, wherein the table includes the column having the VECTOR data type;

storing, in the column, a first vector that has a first number of dimensions and a first dimension format;

storing, in the column, a second vector that has a second number of dimensions and a second dimension format;

wherein the first number of dimensions is different than the second number of dimensions or the first dimension format is different than the second dimension format.

14. The one or more storage media of claim 13, wherein the first number of dimensions is different than the second number of dimensions and the first dimension format is different than the second dimension format.

15. The one or more storage media of claim 13, wherein the table specification does not specify a number of dimensions for vectors that will be stored in the column.

16. The one or more storage media of claim 13, wherein the table specification does not specify a dimension format for vectors that will be stored in the column.

17. The one or more storage media of claim 13, wherein a third vector has a third number of dimensions and a third dimension format, wherein a fourth vector has the third number of dimensions and a fourth dimension format that is different than the third dimension format, wherein the instructions which, when executed by the one or more computing devices, further cause:

receiving a vector query that results in a comparison between the third vector and the fourth vector;

in response to receiving the vector query:

converting the dimension values in the fourth vector to the third dimension format to generate a temporary version of the fourth vector;

performing the comparison between the third vector and the temporary version of the fourth vector.

18. The one or more storage media of claim 13, wherein the instructions which, when executed by the one or more computing devices, further cause:

receiving a second table specification that specifies a second column having the VECTOR data type, wherein the second table specification does not indicate a dimension count or a dimension format for vectors that will be stored in the second column;

storing a first plurality of vectors in the second column;

receiving a database statement that includes an operator that specifies, as input, the first plurality of vectors and a dimension format, and outputs a second plurality of vectors that correspond to the first plurality of vectors and whose dimension values are of the dimension format.

19. The one or more storage media of claim 13, wherein:

storing the first vector comprises storing the first vector in a first vector object that specifies the first number of dimensions and the first dimension format;

storing the second vector comprises storing the second vector in a second vector object that specifies the second number of dimensions and the second dimension format.

20. The one or more storage media of claim 13, wherein the instructions which, when executed by the one or more computing devices, further cause:

storing, in one or more data blocks in persistent storage, a plurality of vector objects of a flexible type;

determining whether each vector object in the one or more data blocks has the same dimension count and the same dimension format;

in response to determining that each vector object in the one or more data blocks have the same dimension count and the same dimension format:

generating metadata that indicates the dimension count and the dimension format;

associating the metadata with the plurality of vector objects.

* * * * *